United States Patent
Doherty et al.

(10) Patent No.: US 7,839,865 B2
(45) Date of Patent: Nov. 23, 2010

(54) DYNAMICALLY CONTROLLING FAIR ACCESS TO A SYSTEM PACKET INTERFACE ATTACHED SWITCH ENCLOSURE

(75) Inventors: Terrence R. Doherty, Costa Mesa, CA (US); Bruce Gregory Warren, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 1149 days.

(21) Appl. No.: 11/044,916

(22) Filed: Jan. 26, 2005

(65) Prior Publication Data
US 2006/0165099 A1 Jul. 27, 2006

(51) Int. Cl.
- H04L 12/28 (2006.01)
- H04L 12/50 (2006.01)
- H04Q 11/00 (2006.01)
- G06F 15/16 (2006.01)

(52) U.S. Cl. ............. 370/397; 370/360; 370/403; 370/412; 709/249

(58) Field of Classification Search ......... 370/230–252, 370/360–397, 442–468, 412–439; 709/212–225
See application file for complete search history.

(56) References Cited

U.S. PATENT DOCUMENTS

| | | | | |
|---|---|---|---|---|
| 5,619,497 | A * | 4/1997 | Gallagher et al. | 370/394 |
| 5,768,257 | A * | 6/1998 | Khacherian et al. | 370/229 |
| 6,108,306 | A * | 8/2000 | Kalkunte et al. | 370/235 |
| 6,118,776 | A * | 9/2000 | Berman | 370/351 |
| 6,324,181 | B1 * | 11/2001 | Wong et al. | 370/403 |
| 6,396,832 | B1 * | 5/2002 | Kranzler | 370/360 |
| 6,459,701 | B1 * | 10/2002 | Henson et al. | 370/405 |
| 6,614,796 | B1 * | 9/2003 | Black et al. | 370/403 |
| 6,779,043 | B1 * | 8/2004 | Crinion | 709/249 |
| 6,901,050 | B1 * | 5/2005 | Acharya | 370/230.1 |
| 6,990,096 | B2 * | 1/2006 | Norman et al. | 370/386 |
| 6,999,460 | B1 * | 2/2006 | Fiore | 370/400 |
| 7,009,985 | B2 * | 3/2006 | Black et al. | 370/403 |
| 7,035,273 | B1 * | 4/2006 | Pannell et al. | 370/412 |
| 7,240,135 | B2 * | 7/2007 | Bai et al. | 710/244 |
| 7,310,332 | B2 * | 12/2007 | Kadambi et al. | 370/360 |
| 7,339,938 | B2 * | 3/2008 | Tzeng | 370/396 |
| 7,366,171 | B2 * | 4/2008 | Kadambi et al. | 370/389 |
| 2002/0018489 | A1 * | 2/2002 | Ambe et al. | 370/475 |
| 2002/0044561 | A1 * | 4/2002 | Coffey | 370/403 |
| 2004/0085974 | A1 * | 5/2004 | Mies et al. | 370/406 |
| 2004/0085994 | A1 * | 5/2004 | Warren et al. | 370/462 |
| 2007/0195699 | A1 * | 8/2007 | Kloth | 370/235 |
| 2009/0213868 | A1 * | 8/2009 | Budhia et al. | 370/419 |

* cited by examiner

*Primary Examiner*—Man Phan
(74) *Attorney, Agent, or Firm*—Morrison & Foerster LLP

(57) ABSTRACT

A method for maintaining configurable and dynamically adjustable per-channel local port/bypass port access ratios in the multiple SOCs within an SPI-attached frame-based switch enclosure to improve the access fairness of devices upstream from the destination device is disclosed. A frame-based switch enclosure may include multiple SPI-attached SOCs, each SOC containing a plurality of ports, with one or more devices connected to each port and one virtual channel assigned to each port. Given a frame-based switch enclosure with N SOCs, the local port/bypass port access ratio for a particular SOC and a given virtual channel, where the particular SOC is M hops away from the SOC having a port corresponding to the given virtual channel and M>0, is 1:(N−M−1), while the local port/bypass port access ratio for the SOC (and the given virtual channel) having the port corresponding to the given virtual channel (i.e. the SOC for which M=0) is 0:0.

18 Claims, 6 Drawing Sheets

DYNAMICALLY CONTROLLING FAIR ACCESS TO A SYSTEM PACKET INTERFACE ATTACHED SWITCH ENCLOSURE

BACKGROUND OF THE INVENTION

1. Field of the Invention

The present invention relates, generally, to device access fairness, and in particular embodiments, to control of device access fairness in a System Packet Interface (SPI) attached switch enclosure.

2. Description of Related Art

As illustrated in the exemplary interconnection diagram of a storage system shown in FIG. 1, non-blocking frame-based crossbar switch enclosures (e.g. frame-based switch enclosures 100 and 102) enable a "fabric" interconnection of a large number of devices such as Host Bus Adapters (HBAs) 104 and 106, and groups of disk drives referred to as Just a Bunch Of Disks (JBODs) 108, 110, 112 and 114. The devices are connected to ports in the frame-based switch enclosures 100 and 102. In FIG. 1, HBA 104 is connected to Port 1 on frame-based switch enclosure 100, JBOD 108 is connected to Port 2, JBOD 110 is connected to Port 3, and frame-based switch enclosure 102 is connected to Port 4.

Note that unlike Fibre Channel (FC) arbitrated loop (AL) storage switch enclosures, which utilize an 8-bit Arbitrated Loop Protocol Address (ALPA), have a 126 device limit, connect and switch loop devices that must share the bandwidth, and cannot be connected to any other storage switch, frame-based switch enclosures utilize a 24-bit address (which includes 8-bit domain and area fields in addition to an 8-bit ALPA), have a much higher device limit, and connect and switch devices that do not have to share the bandwidth. Frame-based switch enclosures also support loop devices, such as disk drives in a JBOD connected via a port, and can also be connected to other frame-based switch enclosures via an inter-switch link.

Although the exemplary frame-based switch enclosures 100 and 102 in FIG. 1 have four ports each for purposes of illustration only, it is often desirable to utilize frame-based switch enclosures with larger numbers of ports. To facilitate frame-based switch enclosures with larger numbers of ports, a number of Application Specific Integrated Circuits (ASICs), each ASIC containing a frame-based switch and referred to as a Switch On a Chip (SOC), may be cascaded to provide a greater number of ports within a frame-based switch enclosure.

As illustrated in the example of FIG. 2, SOCs 200 identified as SOC0, SOC1 and SOC2 are connected within a frame-based switch enclosure 202 using a System Packet Interface (SPI) bus daisy chained to SPI input and output ports on each SOC 200. It should be understood, however, that any number of SOCs could be employed within the frame-based switch enclosure 202, subject to space considerations within the enclosure. SPI is a multi-channel protocol time-division multiplexed (TDMed) over a single bus 204. The SPI bus 204 includes a control line, 16 data lines, and a clock. Conventionally, one virtual channel is assigned for every port in the frame-based switch enclosure 202, although other virtual channel assignment schemes may be employed. In the example of FIG. 2, each SOC 200 also contains four local ports identified as P0, P1, P2 and P3. It should be understood, however, that any number of local ports could be employed within the SOC 200, subject to space considerations within the SOC 200. Connected to the local ports of each SOC 200 can be one or more "don't care" Bunch Of Disks (xBODs) 206, which may be JBODs or Switched Bunch of Disks (SBODs), and one or more HBAs 208 or other devices.

Frames of data may be transferred over the SPI bus in bursts 300 (e.g. 64 bytes), illustrated symbolically in FIG. 3. At the beginning of each burst 300 is a control word 302 which contains the channel IDentifier (ID) 304 and may also contain a Start Of Frame (SOF) indicator 306, an End Of Frame (EOF) indicator 308, and parity information 310. Note that each burst 300 is but a portion of a larger frame 312 (e.g. 2048 bytes).

FIG. 4 illustrates an exemplary four port SOC 400 corresponding to the SOCs illustrated in FIG. 2. In the example of FIG. 4, SOC 400 contains four local ports 402, identified as Port0, Port1, Port2 and Port3. In addition, SOC 400 contains five physical ports 404 within SPI logic 412. Each physical port 404 may be programmably mapped to a virtual channel. A non-blocking crossbar switch core 406 is capable of being configured to make connections between the four local ports 402 and the five physical ports 404. SOC 400 also contains a processor 408 and a router 410 for configuring the switch core 406. Within SPI logic 412 is a transmit buffer bank 414 connected to an SPI output port 416, a receive buffer bank 418 connected to an SPI input port 420, and a pass-through First-In-First-Out buffer (FIFO) 422 connected between the transmit buffer bank 414 and the receive buffer bank 418. Note that in the example of FIG. 4, both the transmit buffer bank 414 and the receive buffer bank 418 contain one buffer for each virtual channel in the frame-based switch enclosure within which the SOC 400 resides. However, the buffer banks may be programmable to handle a different number of virtual channels. Each buffer may be able to store one or more bursts. The receive buffer bank 418 is connected to the five physical ports 404 at 426, which are connected to the transmit buffer bank 414 at 424.

In the case where a burst of data is to be sent from Port0 to Port3, for example, a request to send the data is first received at Port0. When sending data between local ports the D_ID (destination identifier) of a FC frame is used to "route" the frames between ports. If the request is granted (i.e. the ports needed to make the connection are available), the burst of data is routed through switch core 406 by the router 410, and transmitted at Port3 without involvement of the SPI logic 412.

In the case where a burst of data is to be sent from Port1 to SPI output port 416 for transmission to another SOC, for example, a request to send the data is first received at Port1. If the request is granted (i.e. the ports needed to make the connection are available within the SOC 400), the data is received at Port1, and the router 410 configures the switch core 406 such that the data is routed through a physical port 404 to transmit buffer bank 414 where it is stored in the appropriate virtual channel buffer. The stored data may then be transmitted at SPI output port 416.

In the case where a burst of data is to be sent from SPI input port 420 to Port2, for example, a request to send the data is first received at the SPI input port 420. If the request is granted (i.e. the ports needed to make the connection are available and ownership of the virtual channel is available within the SOC 400), the data is first stored in the appropriate virtual channel buffer of the receive buffer bank 418. The router 410 then configures the switch core 406 such that the data is routed from the receive buffer bank 418 through the physical port 404 mapped to the particular virtual channel associated with Port2 and over to Port2, where it is output.

In the case where a burst of data is to be sent from SPI input port 420 to SPI output port 416, for example, a request to send the data is first received at the SPI input port 420. If the request is granted (i.e. the ports needed to make the connection are available and ownership of the channel is available within SOC 400), the data is first stored in the appropriate channel buffer of the receive buffer bank 418. The data is then sent to pass-through FIFO 422 and on to the appropriate virtual channel buffer of the transmit buffer bank 418, where it is output.

As the foregoing examples suggest, while data from a local port (i.e. Port0-Port3) is being sent to the SPI output port 416 (i.e. while a local port has ownership of the virtual channel), data from the SPI input port 420 on the same virtual channel and destined for the SPI output port 416 (i.e. data utilizing the pass-through FIFO 422) cannot be transmitted, because the same virtual channel buffer in transmit buffer bank 414 is needed for both paths. While data from a local port is being sent to the SPI output port 416, data from the SPI input port 420 on the same virtual channel fills up the appropriate channel buffer in the receive buffer bank 418. Once that channel buffer is full, a feedback signal is sent back to the other SOCs, instructing them to temporarily suspend the transmission of data on that channel.

Because it is desirable to send an entire of frame of data through a local port before giving up ownership of the virtual channel, data in a channel buffer may have to wait a long time before it can be sent. Similarly, while data being received by the SPI input port 420 is being sent to the SPI output port 416 (i.e. while the pass-through FIFO 422 has ownership of the virtual channel), data from a local port on the same virtual channel and destined for the SPI output port 416 cannot be transmitted. Data may still be transmitted on other virtual channels. That is, if one channel is blocked and waiting for ownership, other channels may still transmit data to the SPI bus. To ensure that repeated data requests from a local port do not prevent data requests from the SPI input port 420 from being processed, or vice versa, a simple conventional fairness scheme alternates the processing of frames of data on the same virtual channel between a local port and the SPI input port 420.

However, even though frames of data on the same virtual channel from local ports and the SPI input port take turns being transmitted through SPI output port, a starvation problem can nevertheless occur when multiple SOCs are cascaded within a frame-based switch enclosure.

FIG. 5 illustrates an exemplary frame-based switch enclosure 500 with four SOCs 502, identified as SOC0, SOC 1, SOC2 and SOC3. For simplicity of explanation, each SOC in FIG. 5 has one local port identified as P0. As mentioned above, one virtual channel is assigned to each port within a frame-based switch enclosure. In the example of FIG. 5, P0 of SOC0 is connected to disk drive 0 (D0) and assigned virtual channel 1 (SOC1), Port0 of SOC1 is connected to an initiator 504 (e.g. an HBA) and assigned virtual channel 2 (SOC2), P0 of SOC2 is connected to disk drive 2 (D2) and assigned virtual channel 3 (SOC3), and P0 of SOC3 is connected to disk drive 3 (D3) and assigned virtual channel 4 (SOC4). In the example of FIG. 5, drives D0, D2 and D3 are all sending data back to initiator 504 using CH2.

In the example of FIG. 5, because the initiator 504 is not sending data to any other device, no data bursts appear on SPI output port 506 of SOC1. Because D0 is sending data to initiator 504, frames of data from D0 (see reference character 508) must be sent to SPI output port 510 of SOC0. In addition, because no data is arriving at SPI input port 512 of SOC0, no alternating of frames is necessary in SOC0, and SPI output port 510 will repeatedly output the frames of data from D0 (see reference character 514). In SOC3, data from D3 must be sent to initiator 504 through SPI output port 516, and also the data arriving at SPI input port 518 from SOC0 must be sent to initiator 504 through the same SPI output port 516. Using an alternating frame fairness scheme, SPI output port 516 will alternate outputting frames from D3 (see reference character 520) and frames from SOC0 (which are the frames from D0; see reference character 522). In SOC 2, data from D2 must be sent to initiator 504 through SPI output port 524, and also the data arriving at SPI input port 526 from SOC3 must be sent to initiator 504 through the same SPI output port 524. Using an alternating frame fairness scheme, SPI output port 524 will alternate outputting frames from D2 (see reference character 528) and frames from SOC3 (which are the frames from D3 and D0; see reference character 530). Because frames from SOC3 alternate between frames from D3 and D0, SPI output port 524 transmits frames from D3 and D0 only once every four frames, as compared to frames from D2 which are transmitted every other frame. Thus, devices that are "upstream" from the destination port are starved as compared to devices that are closer to the destination port.

Therefore, there is a need to improve the access fairness of upstream devices in SPI attached frame-based storage switch enclosures.

SUMMARY OF THE INVENTION

The present invention is directed to maintaining configurable and dynamically adjustable per-channel local port/bypass port access ratios in the multiple SOCs within an SPI-attached frame-based switch enclosure to improve the access fairness of devices upstream from the destination device.

A frame-based switch enclosure may include multiple SPI-attached SOCs, each SOC containing a plurality of ports, with one or more devices connected to each port and one virtual channel assigned to each port. A local port/bypass port access ratio for a particular SOC for a given virtual channel is determined according to the total number of SOCs in the SPI loop, and the particular SOC's upstream position from the SOC whose port corresponds to the given virtual channel (or in other words, the number of "hops" the particular SOC is away from the SOC whose port corresponds to the given virtual channel).

In general, given a frame-based switch enclosure with N SOCs, the local port/bypass port access ratio for a particular SOC and a given virtual channel, where the particular SOC is M hops away from the SOC having a port corresponding to the given virtual channel and M>0, is 1:(N−M−1), while the local port/bypass port access ratio for the SOC (and the given virtual channel) having the port corresponding to the given virtual channel (i.e. the SOC for which M=0) is 0:0. Stated another way, for each particular virtual channel, an SOC can be identified whose port corresponds to the particular virtual channel, and the local port/bypass port access ratio for the identified SOC and the particular virtual channel may be assigned as 0:0. The local port/bypass port access ratio for all other SOCs and the particular virtual channel can be computed as 1:(N−M−1), wherein the SOC is M hops away from the identified SOC. These ratios may be programmed into registers in the SOC by the processor within the SOC. In alternative embodiments, a processor in one SOC or an external processor can program the local port/bypass port access ratios for all virtual channels in all SOCs.

As the description above indicates, a local port/bypass port access ratio is maintained in registers for every virtual channel and SOC. Thus, in a frame-based switch enclosure with four SPI-attached SOCs (SOC0-SOC3) and four ports per SOC for a total of 16 virtual channels (SOC1-CH16) assigned in sequentially increasing order to the four SOCs, the following local port/bypass port access ratios are maintained:

|      | SOC0 | SOC1 | SOC2 | SOC3 |
|------|------|------|------|------|
| CH1  | 0:0  | 1:2  | 1:1  | 1:0  |
| CH2  | 0:0  | 1:2  | 1:1  | 1:0  |
| CH3  | 0:0  | 1:2  | 1:1  | 1:0  |
| CH4  | 0:0  | 1:2  | 1:1  | 1:0  |
| CH5  | 1:0  | 0:0  | 1:2  | 1:1  |
| CH6  | 1:0  | 0:0  | 1:2  | 1:1  |
| CH7  | 1:0  | 0:0  | 1:2  | 1:1  |
| CH8  | 1:0  | 0:0  | 1:2  | 1:1  |
| CH9  | 1:1  | 1:0  | 0:0  | 1:2  |
| CH10 | 1:1  | 1:0  | 0:0  | 1:2  |
| CH11 | 1:1  | 1:0  | 0:0  | 1:2  |
| CH12 | 1:1  | 1:0  | 0:0  | 1:2  |
| CH13 | 1:2  | 1:1  | 1:0  | 0:0  |
| CH14 | 1:2  | 1:1  | 1:0  | 0:0  |
| CH15 | 1:2  | 1:1  | 1:0  | 0:0  |
| CH16 | 1:2  | 1:1  | 1:0  | 0:0  |

In alternative embodiments of the present invention, the local port/bypass port access ratios may be programmed and stored differently from what is shown in the table above, if one SOC needs to be given a higher priority. The ratios shown above could be stored initially by the processor in each SOC, then once the frame-based switch enclosure is operated for a period of time, empirical measurements could reveal that there is still some unfairness. To correct this unfairness, some of the ratios could be changed by the processors.

Other alternative embodiments of the present invention take into account the activity present at each port, and adjust the local port/bypass port access ratios accordingly. In one embodiment, within each SOC, the number of bytes of data flowing in each channel can be counted by the processor in the SOC. This information could be shared in frames passed over a control channel SOC0, and each processor may then make the adjustments to the local port/bypass port access ratio for its SOC and channels based on all of the collected activity information, or one processor could adjust the ratios for all SOCs and channels. In another embodiment, a stream of successive frames of data flowing over the SPI bus may be counted by a processor in an SOC as they are received at that SOC, and that processor would make adjustments to its local port/bypass port access ratio based on the collected activity information.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention are directed to maintaining configurable and dynamically adjustable per-channel local port/bypass port access ratios to improve the access fairness of devices upstream from the destination device in SPI attached frame-based storage switch enclosures. As described above, alternating the channel access in a 1:1 ratio between any local port and a bypass port (the SPI input port) in a frame-based storage switch enclosure may produce starvation of devices upstream from the destination device. However, by adjusting the 1:1 channel access ratio to some other ratio that provides better access opportunities to devices upstream from the destination device, improved fairness can be achieved.

Figure 6:
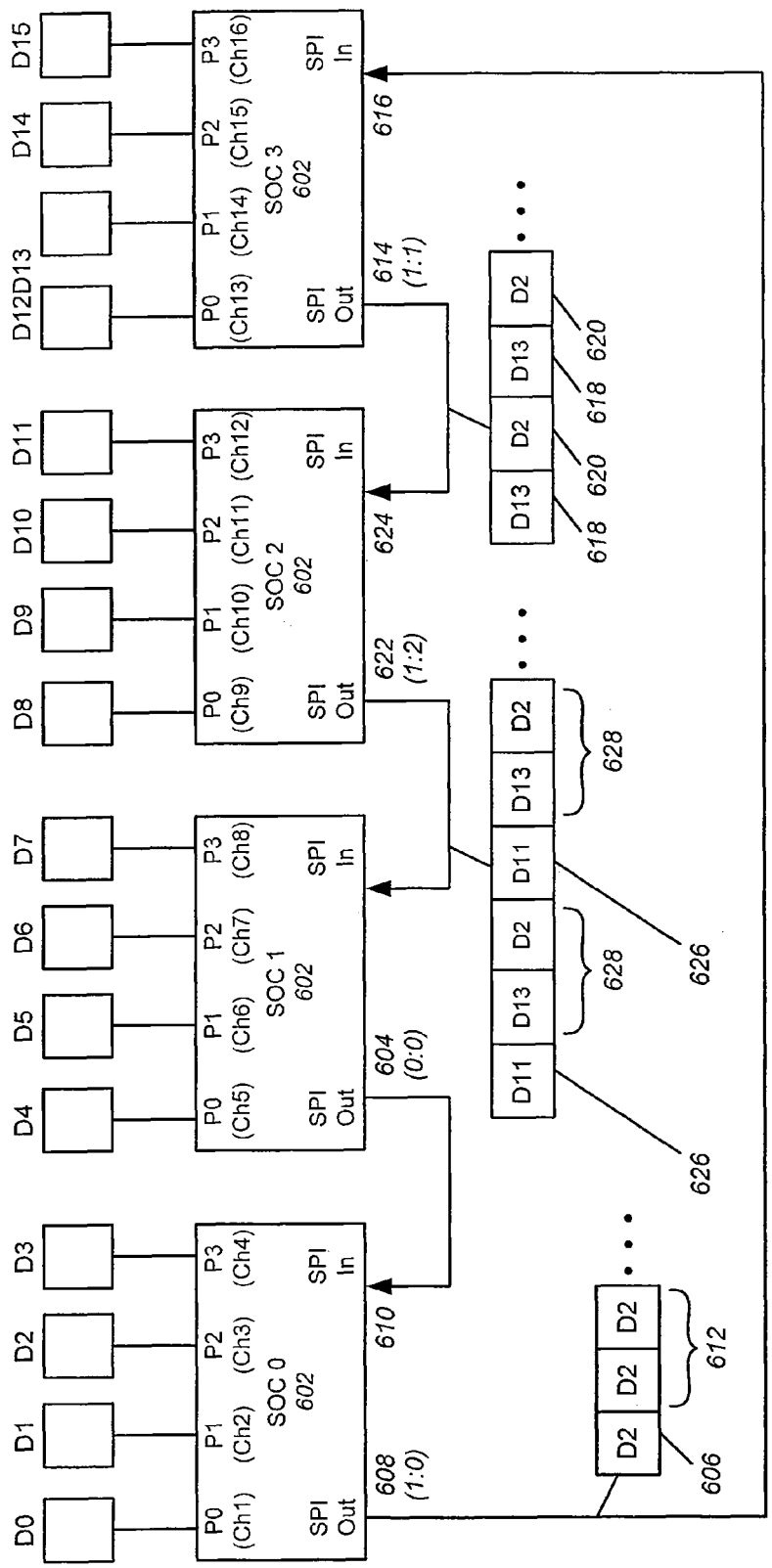
FIG. 6 illustrates an exemplary SPI attached frame-based switch enclosure implementing configurable and dynamically adjustable per-channel local port/bypass port access ratios to improve the access fairness of devices upstream from the destination device according to embodiments of the present invention.

FIG. 6 illustrates an exemplary SPI attached frame-based switch enclosure 600 implementing configurable and dynamically adjustable per-channel local port/bypass port access ratios to improve the access fairness of devices upstream from the destination device according to embodiments of the present invention. The frame-based switch enclosure 600 of FIG. 6 includes four SOCs 602, identified as SOC0, SOC1, SOC2 and SOC3, connected serially together using an SPI bus. Each SOC 602 has four local ports identified as Port0-Port3. Devices D0-D15 are connected to ports Port0-Port3. As mentioned above, one virtual channel is assigned to each port within a frame-based switch enclosure. Therefore, the 16 local ports in FIG. 6 are assigned virtual channels SOC1-CH16 (see channel assignments in parentheses in FIG. 6). These channel assignments may be made during initialization of the frame-based switch enclosure 600, when the processors in the SOCs communicate using frames sent over a special channel (SOC0). As a result of these communications, an IDentifier (ID) is determined for each SOC, and the order of the SOCs in the serial SPI bus connection is determined. The channels may then be assigned in sequential order to the SOCs, in order.

In embodiments of the present invention, the local port/bypass port access ratio for a particular SOC for a given virtual channel is determined according to the total number of SOCs in the SPI loop, and the particular SOC's upstream position from the SOC whose port corresponds to the given virtual channel (or in other words, the number of SPI bus "hops" the particular SOC is away from the SOC whose port corresponds to the given virtual channel). In general, given a frame-based switch enclosure with N SOCs, the local port/bypass port access ratio for a particular SOC and a given virtual channel, where the particular SOC is M hops away from the SOC having a port corresponding to the given virtual channel and M>0, is 1:(N−M−1), while the local port/bypass port access ratio for the SOC (and the given virtual channel) having the port corresponding to the given virtual channel (i.e. the SOC for which M=0) is 0:0. Stated another way, for each particular virtual channel, an SOC can be identified whose port corresponds to the particular virtual channel, and the local port/bypass port access ratio for the identified SOC and the particular virtual channel may be assigned as 0:0. The local port/bypass port access ratio for all other SOCs and the particular virtual channel can be computed as 1:(N−M−1), wherein the SOC is M hops away from the identified SOC.

Because the storage system 600 has a fixed number of ports, each assigned to a particular virtual channel, the processors in each of the SOCs 602 can communicate via frames sent over the SPI bus using a special channel (SOC0) to automatically compute these local port/bypass port access ratios. This is accomplished in the same manner that data frames are sent between local ports or between the SPI and a local port. Embedded in a FC frame is a Destination ID (D_ID) and a Source ID (S_ID) which identifies the sending and receiving device. The D_ID and S_ID are sent to the router, which looks up the destination port. The destination port can be a local port, a SPI physical port or the "processor" port. When the processors wish to communicate with each other they will send data with a D_ID assigned to the processors. They may in fact be assigned multiple addresses. When one a frame with one of these addresses is received from a SPI physical port, the D_ID is sent to the router which will identify the processor as the destination. The switch core is then connected and the frame is passed to the processor, where the processor can do what it wants with it or forward it back out to the SPI bus. In one embodiment of the present invention, the local port/bypass port access ratios may be computed and programmed into registers in the SOC by the processor within the SOC. In alternative embodiments, a processor in one SOC or an external processor can compute and program the local port/bypass port access ratios for all virtual channels in all SOCs. The processors may perform these functions under the control of firmware, which may be loaded from storage media into each of the SOCs.

For example, assume that in FIG. 6, D4 is a HBA and therefore a destination for devices sending data back to D4 using SOC5. N equals four because there are four SOCs in the frame-based switch enclosure. Counting upstream from the initiator D4, SOC2 is one hop away (M=1), SOC3 is two hops away (M=2), and SOC0 is three hops away (M=3). Therefore, the local port/bypass port access ratio for CH5 of SOC2 is 1:(4−1−1) or 1:2. In other words, for every frame of data transmitted on CH5 from a local port in SOC2, two frames of data on CH5 from the bypass port will be transmitted. Similarly, the local port/bypass port access ratio for CH5 of SOC3 is 1:(4−2−1) or 1:1. In other words, for every frame of data transmitted on CH5 from a local port in SOC3, one frame of data on CH5 from the bypass port will be transmitted. Similarly, the local port/bypass port access ratio for CH5 of SOC0 is 1:(4−3−1) or 1:0. In other words, for every frame of data transmitted on CH5 from a local port in SOC3, no frame of data on CH5 from the bypass port will be transmitted.

Figure 1:
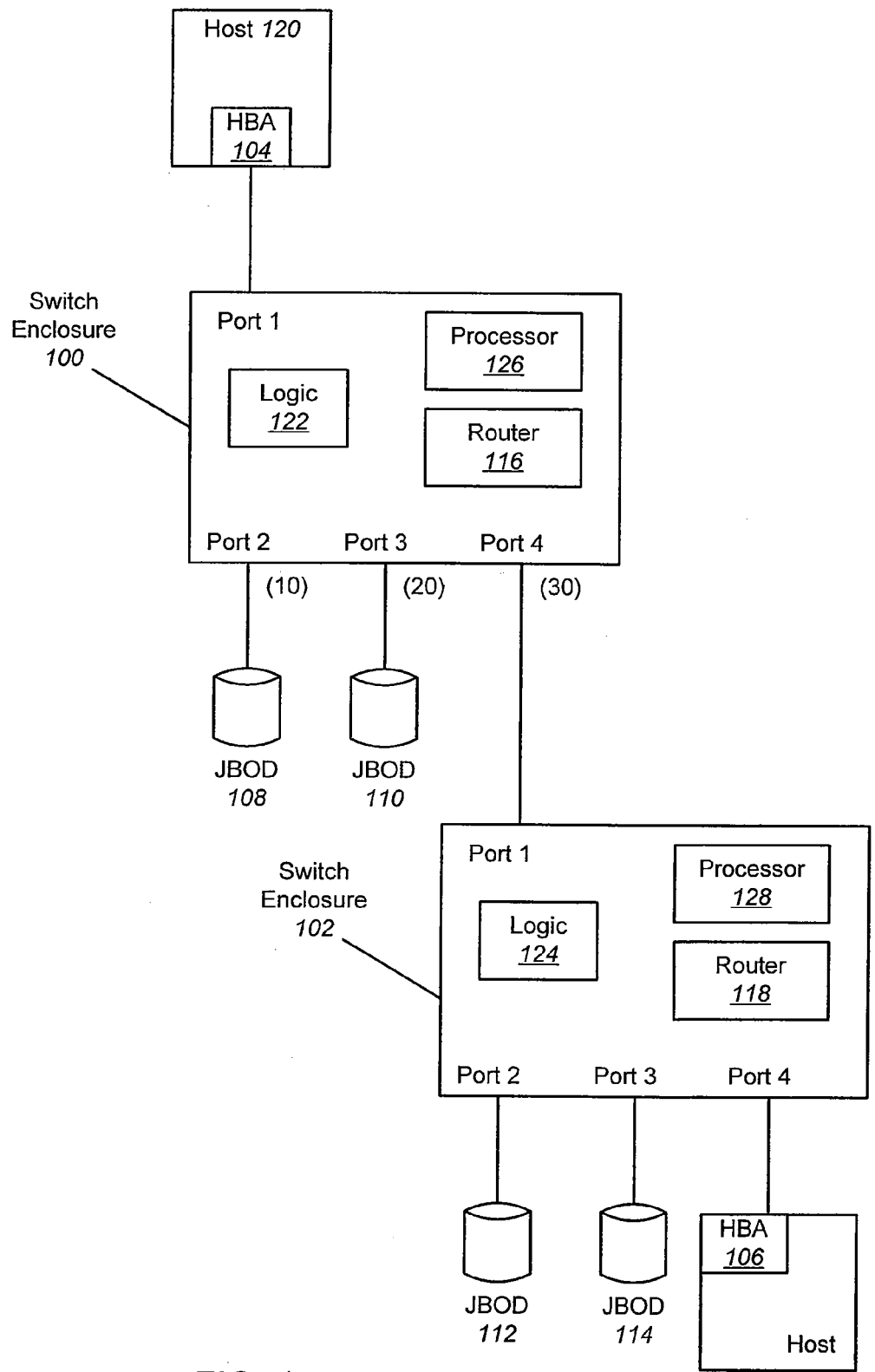
FIG. 1 is an exemplary interconnection diagram of a storage system comprised of frame-based switch enclosures.
Figure 2:
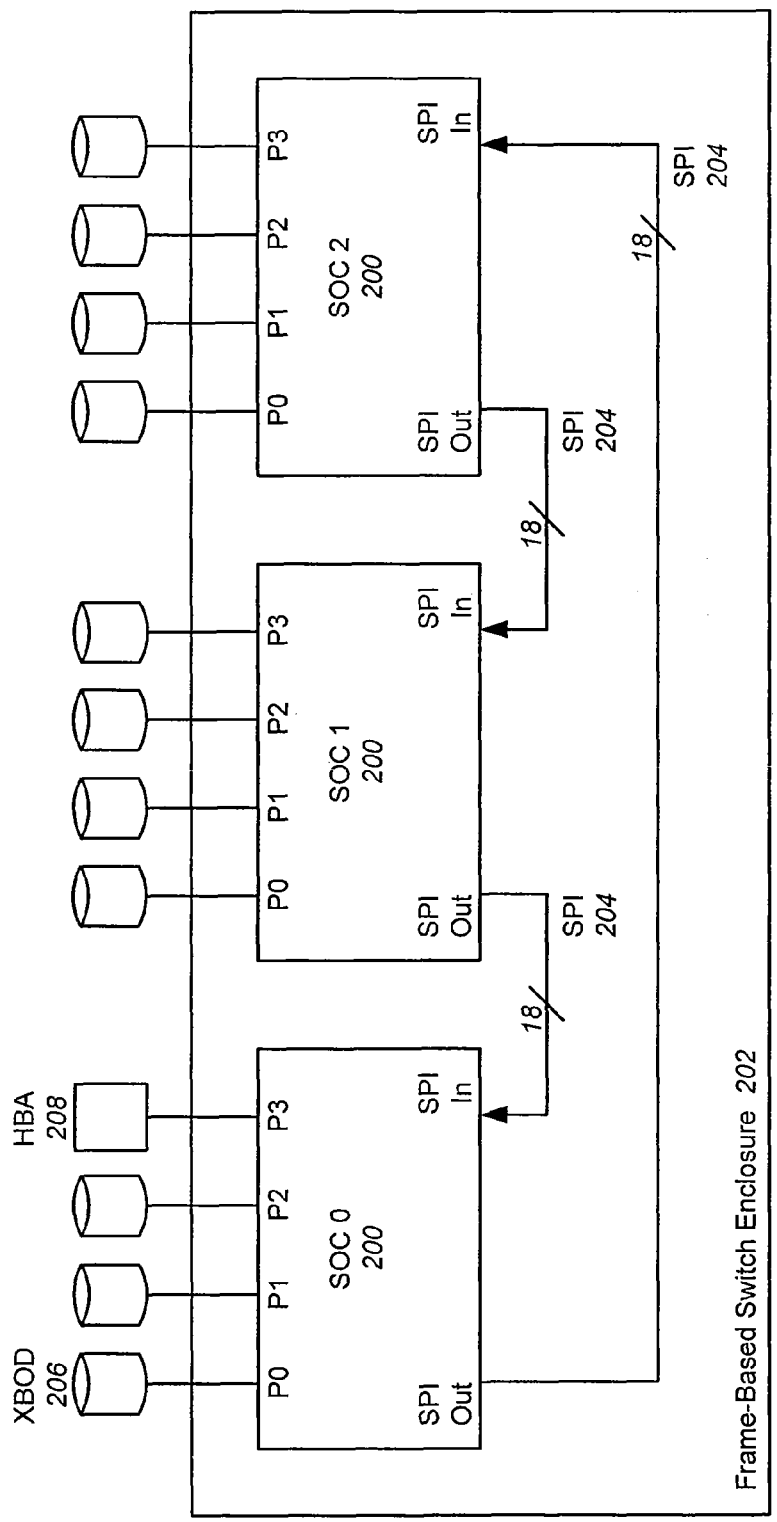
FIG. 2 illustrates an exemplary SPI attached frame-based switch enclosure.
Figure 3:
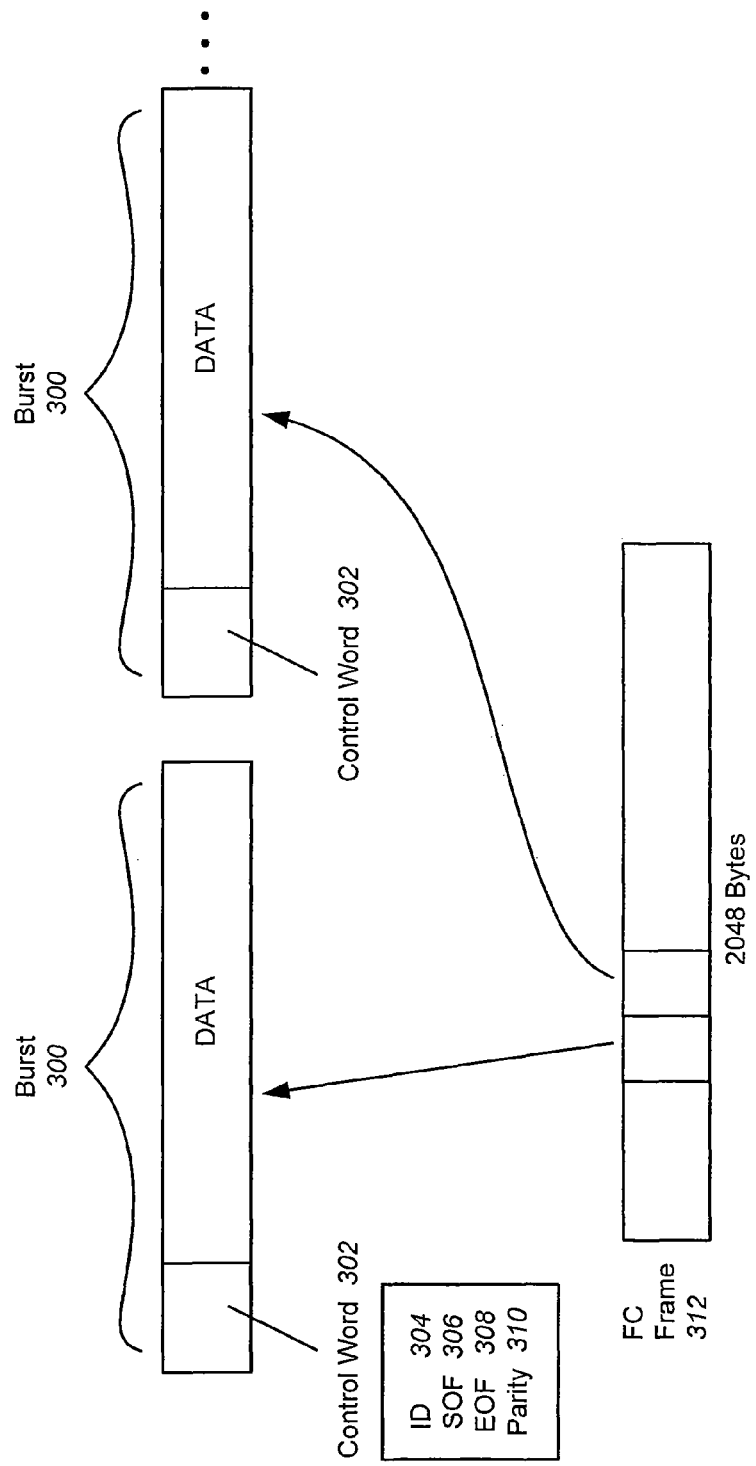
FIG. 3 illustrates the format of bursts of data that form a portion of a frame that may be transferred over the SPI bus.
Figure 4:
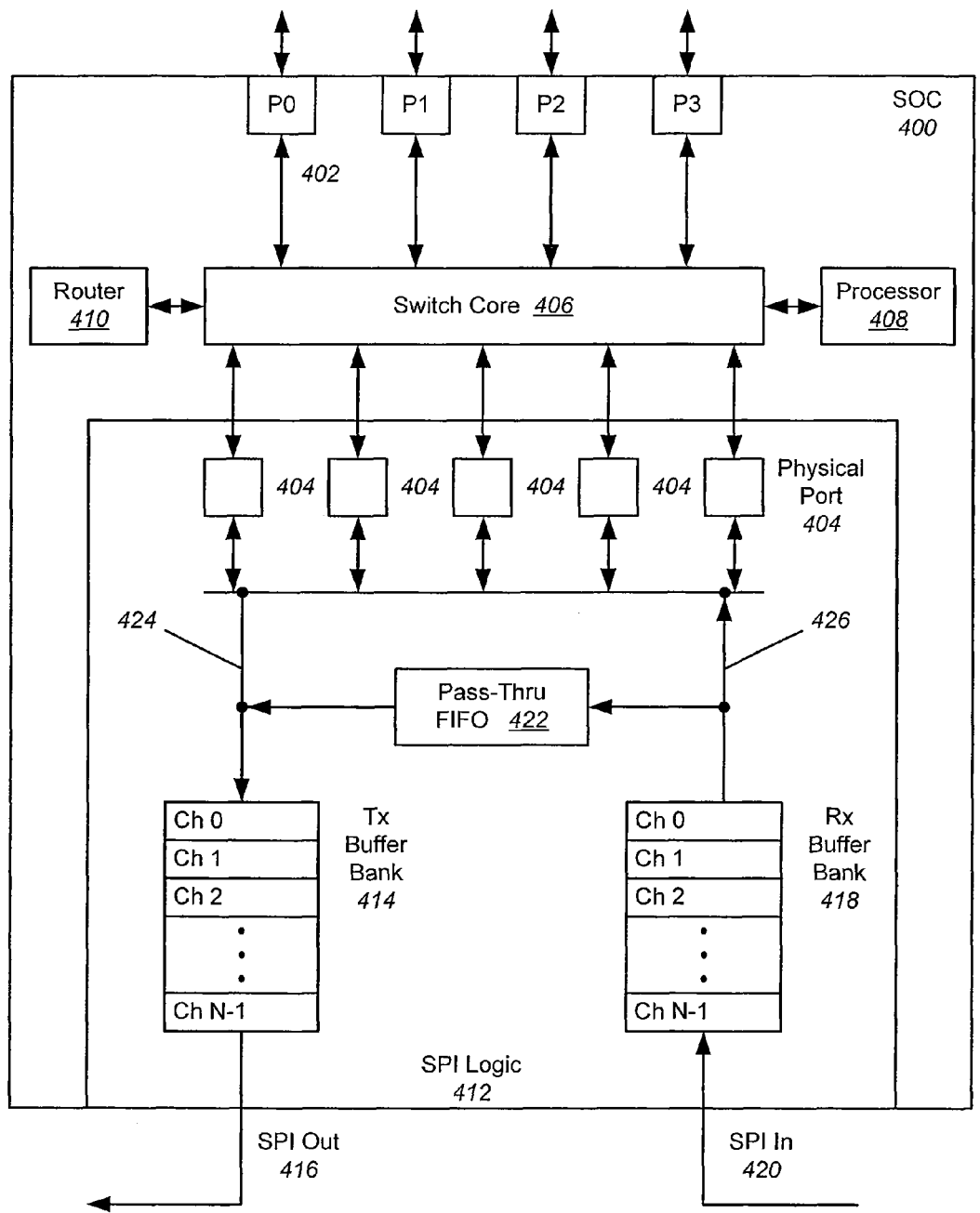
FIG. 4 illustrates an exemplary four port SOC including local ports, SPI logic, a switch core, processor and router.
Figure 5:
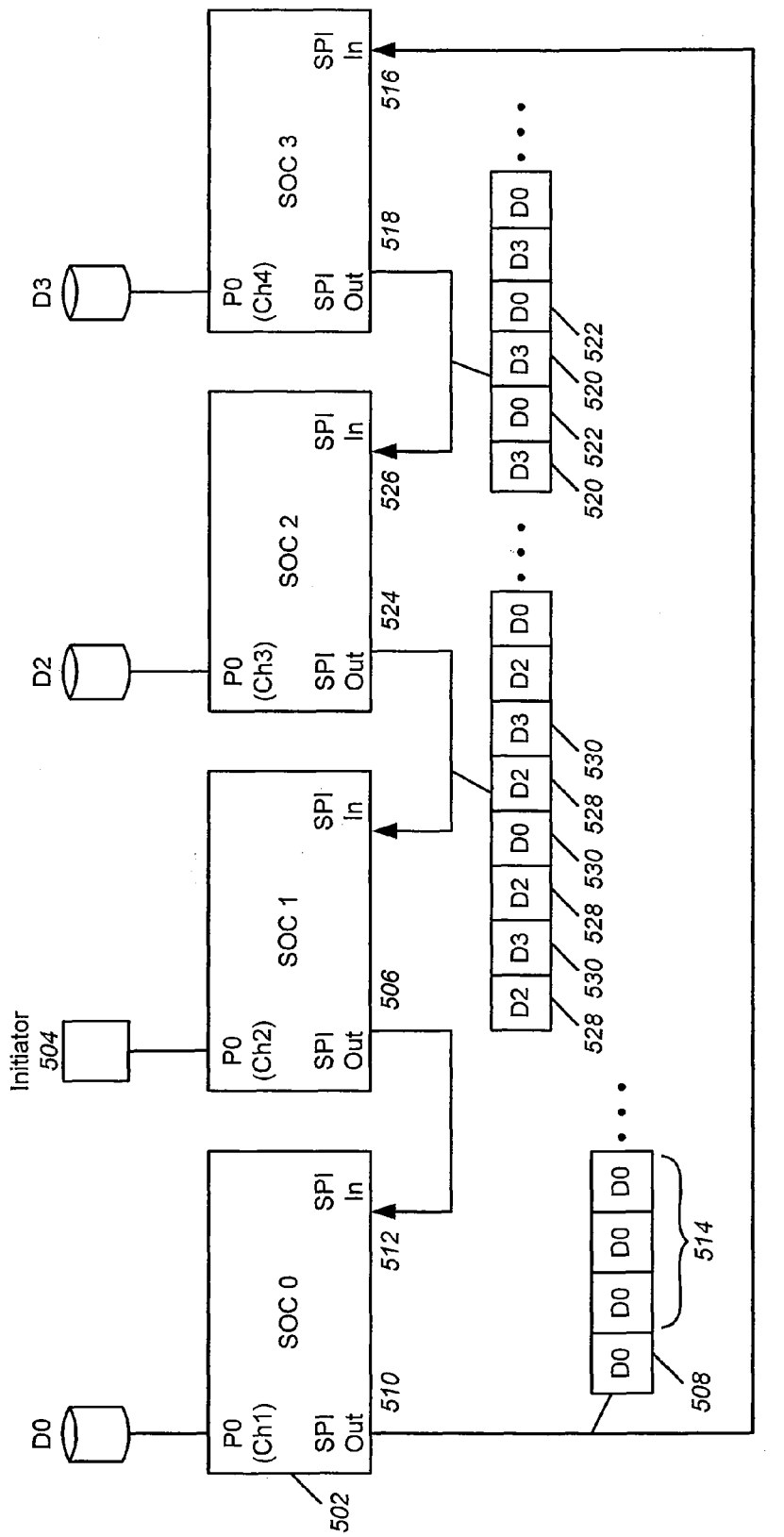
FIG. 5 illustrates an exemplary SPI attached frame-based switch enclosure and the starvation of devices upstream from the destination device.

With the local port/bypass port access ratios determined, assume that D2, D11 and D13 are sending data back on CH5 to the initiator D4. (This is similar to the example of FIG. 5—one device per SOC sending data on the same channel back to an initiator.) Because the initiator D4 is not sending data to any other device on SOC5, no data bursts appear on SPI output port 604 of SOC1. This is consistent with the local port/bypass port access ratio of 0:0 for SOC1 (i.e. no frames sent out of the SPI output port for that channel). Because D2 is sending data to initiator D4 on SOC5, frames of data from D2 (see reference character 606) must be sent to SPI output port 608 of SOC0. In addition, because no data is arriving at SPI input port 610 of SOC0 on SOC5, no alternating of frames is necessary in SOC0, and SPI output port 608 will repeatedly output the frames of data from D2 (see reference character 612) on SOC5. This is consistent with the local port/bypass port access ratio of 1:0 for CH5 on SOC0 (i.e. all frames on CH5 sent from a local port, none from the bypass port). In SOC3, data from D13 must be sent to initiator D4 through SPI output port 614 on SOC5, and also the data arriving at SPI input port 616 from SOC0 on CH5 must be sent to initiator D4 through the same SPI output port 614. According to the local port/bypass port access ratio of 1:1 for CH5 on SOC3, SPI output port 614 will alternate outputting frames from D13 (see reference character 618) and frames from SOC0 (which are the frames from D2; see reference character 620). In SOC2, data from D11 must be sent to initiator D4 through SPI output port 622, and also the data arriving at SPI input port 624 from SOC3 must be sent to initiator D4 through the same SPI output port 622. According to the local port/bypass port access ratio of 1:2 for CH5 on SOC2, SPI output port 622 will output one frame from D11 of CH5 (see reference character 626) and two frames from SOC3 on CH5 (which are the frames from D13 and D2; see reference character 628). As a result, SPI output port 622 alternately transmits frames from D11, D13 and D2, and fairness is achieved for devices that are upstream from the destination port.

As described above, a local port/bypass port access ratio is maintained in registers for every virtual channel and SOC. Thus, in the example of FIG. 6, the following local port/bypass port access ratios are maintained:

|      | SOC0 | SOC1 | SOC2 | SOC3 |
| ---- | ---- | ---- | ---- | ---- |
| CH1  | 0:0  | 1:2  | 1:1  | 1:0  |
| CH2  | 0:0  | 1:2  | 1:1  | 1:0  |
| CH3  | 0:0  | 1:2  | 1:1  | 1:0  |
| CH4  | 0:0  | 1:2  | 1:1  | 1:0  |
| CH5  | 1:0  | 0:0  | 1:2  | 1:1  |
| CH6  | 1:0  | 0:0  | 1:2  | 1:1  |
| CH7  | 1:0  | 0:0  | 1:2  | 1:1  |
| CH8  | 1:0  | 0:0  | 1:2  | 1:1  |
| CH9  | 1:1  | 1:0  | 0:0  | 1:2  |
| CH10 | 1:1  | 1:0  | 0:0  | 1:2  |
| CH11 | 1:1  | 1:0  | 0:0  | 1:2  |
| CH12 | 1:1  | 1:0  | 0:0  | 1:2  |
| CH13 | 1:2  | 1:1  | 1:0  | 0:0  |
| CH14 | 1:2  | 1:1  | 1:0  | 0:0  |
| CH15 | 1:2  | 1:1  | 1:0  | 0:0  |
| CH16 | 1:2  | 1:1  | 1:0  | 0:0  |

Embodiments of the present invention described above do not account for differences in the activity level at each port. In the example of FIG. 6, if devices D11, D13 and D2 in the preceding discussion were not transmitting the same amount of data to the initiator D4 at the same rates, some amount of unfairness would still exist. Therefore, alternative embodiments of the present invention take into account the activity present at each port, and adjust the local port/bypass port access ratios accordingly. The local port/bypass port access ratios may be programmed and stored differently from what is shown in the table above, if one SOC needs to be given a higher priority. The ratios shown above could be stored initially by the processor in each SOC, then once the frame-based switch enclosure is operated for a period of time, empirical measurements could reveal that there is still some unfairness. To correct this unfairness, some of the ratios could be changed by the processors. In the example of FIG. 6, if SOC2 was to be given higher priority, the local port/bypass port access ratio for SOC2 could be set to 2:3 instead of 1:2, for example.

In one embodiment, within each SOC, the number of bytes of data flowing in each channel can be counted by the processor in the SOC. This information could be shared in frames passed over the control channel SOC0, and each processor may then make the adjustments to the local port/bypass port access ratio for its SOC and channels based on all of the collected activity information, or one processor could adjust the ratios for all SOCs and channels. In another embodiment, a stream of successive frames of data flowing over the SPI bus may be counted by a processor in an SOC as they are received at that SOC and the source port of those frames may be identified. The processor would make adjustments to its local port/bypass port access ratio based on the collected activity information. In either case, in the current example the amount of data being sent from D11 on SOC2, the amount of data being sent from D13 on SOC3, and the amount of data being sent from D2 on SOC0 can be determined, either directly or indirectly. In the example of FIG. 6, if no data was actually being transmitted from D2, then the local port/bypass port access ratio for CH5 in SOC0 could be adjusted to 0:0, the local port/bypass port access ratio for CH5 on SOC3 could be adjusted to 1:0, and local port/bypass port access ratio for CH5 on SOC2 could be adjusted to 1:1.

Depending on the activity present at each port, the local port/bypass port access ratios may be adjusted in a number of different ways to provide greater fairness. In general, for a given SOC and virtual channel, if measured activity in the virtual channel in the upstream SOC is higher than the measured activity in the virtual channel in the given SOC, then the local port/bypass port access ratio may be lowered. If measured activity in the virtual channel in the upstream SOC is lower than the measured activity in the virtual channel in the given SOC, then the local port/bypass port access ratio may be raised.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for maintaining configurable and dynamically adjustable per-channel local port/bypass port access ratios in a plurality of frame-based Switches On a Chip (SOCs) within a multi-port switch enclosure, each port having an assigned virtual channel, to improve an access fairness of devices attached to the ports, the method comprising:
for each particular virtual channel,
assigning a local port/bypass port access ratio for each SOC and the particular virtual channel;
monitoring an amount of activity present at each port; and
adjusting the local port/bypass port access ratios in accordance with the amount of activity present at each port to improve an access fairness of devices attached to the ports.

2. The method as recited in claim 1, each of the frame-based SOCs having an internal processor, the method further comprising:
utilizing the processor in each SOC to determine the local port/bypass port access ratios for that SOC and all virtual channels.

3. The method as recited in claim 1, each of the frame-based SOCs having an internal processor, the method further comprising:
utilizing the processor in one SOC to determine the local port/bypass port access ratios for all SOCs and all virtual channels.

4. The method as recited in claim 1, further comprising directly monitoring the amount of activity present at each port by counting bytes of data flowing in the virtual channel associated with that port.

5. The method as recited in claim 1, further comprising indirectly monitoring the amount of activity present at each port by counting frames of data flowing between SOCs and identifying the source port of those frames.

6. The method as recited in claim 1, further comprising:
for a given SOC and virtual channel,
lowering the local port/bypass port access ratio for the given SOC and virtual channel if measured activity in the virtual channel in an upstream SOC is higher than the measured activity in the virtual channel in the given SOC, and
increasing the local port/bypass port access ratio for the given SOC and virtual channel if the measured activity in the virtual channel in the upstream SOC is lower than the measured activity in the virtual channel in the given SOC.

7. One or more storage media including a computer program which, when executed by one or more processors, maintains configurable and dynamically adjustable per-channel local port/bypass port access ratios in a plurality of frame-based Switches On a Chip (SOCs) within a multi-port switch enclosure, each port having an assigned virtual channel, to improve an access fairness of devices attached to the ports by causing the one or more processors to perform the steps of:
for each particular virtual channel,
assigning a local port/bypass port access ratio for each SOC and the particular virtual channel;
monitoring an amount of activity present at each port; and
adjusting the local port/bypass port access ratios in accordance with the amount of activity present at each port to improve an access fairness of devices attached to the ports.

8. The one or more storage media as recited in claim 7, wherein the computer program, when executed by an internal processor in an SOC, causes the processor to perform the step of:
determining the local port/bypass port access ratios for that SOC and all virtual channels.

9. The one or more storage media as recited in claim 7, wherein the computer program, when executed by an internal processor in an SOC, causes the processor to perform the step of:
determining the local port/bypass port access ratios for all SOCs and all virtual channels.

10. The one or more storage media as recited in claim 7, wherein the computer program, when executed by the one or more processors, causes the one or more processors to perform the step of:
directly monitoring the amount of activity present at each port by counting bytes of data flowing in the virtual channel associated with that port.

11. The one or more storage media as recited in claim 7, wherein the computer program, when executed by the one or more processors, causes the one or more processors to perform the step of:
indirectly monitoring the amount of activity present at each port by counting frames of data flowing between SOCs and identifying the source port of those frames.

12. The one or more storage media as recited in claim 7, wherein the computer program, when executed by the one or more processors, causes the one or more processors to perform the steps of:

for a given SOC and virtual channel,
lowering the local port/bypass port access ratio for the given SOC and virtual channel if measured activity in the virtual channel in an upstream SOC is higher than the measured activity in the virtual channel in the given SOC, and
increasing the local port/bypass port access ratio for the given SOC and virtual channel if the measured activity in the virtual channel in the upstream SOC is lower than the measured activity in the virtual channel in the given SOC.

13. In a multi-port switch enclosure including a plurality of frame-based Switches On a Chip (SOCs) and a virtual channel assigned to each port, one or more processors in each SOC programmed for maintaining configurable and dynamically adjustable per-channel local port/bypass port access ratios to improve an access fairness of devices attached to the ports by performing a method comprising:
for each particular virtual channel,
assigning a local port/bypass port access ratio for each SOC and the particular virtual channel;
monitoring an amount of activity present at each port; and
adjusting the local port/bypass port access ratios in accordance with the amount of activity present at each port to improve an access fairness of devices attached to the ports.

14. The one or more programmed processors as recited in claim 13, further programmed for:
utilizing the processor in each SOC to determine the local port/bypass port access ratios for that SOC and all virtual channels.

15. The one or more programmed processors as recited in claim 13, further programmed for:
utilizing the processor in one SOC to determine the local port/bypass port access ratios for all SOCs and all virtual channels.

16. The one or more programmed processors as recited in claim 13, further programmed for directly monitoring the amount of activity present at each port by counting bytes of data flowing in the virtual channel associated with that port.

17. The one or more programmed processors as recited in claim 13, further programmed for indirectly monitoring the amount of activity present at each port by counting frames of data flowing between SOCs and identifying the source port of those frames.

18. The one or more programmed processors as recited in claim 13, further programmed for:
for a given SOC and virtual channel,
lowering the local port/bypass port access ratio for the given SOC and virtual channel if measured activity in the virtual channel in an upstream SOC is higher than the measured activity in the virtual channel in the given SOC, and
increasing the local port/bypass port access ratio for the given SOC and virtual channel if the measured activity in the virtual channel in the upstream SOC is lower than the measured activity in the virtual channel in the given SOC.

* * * * *